June 13, 1939.  R. C. PLUECKHAHN  2,162,638
DASH MANIPULATED HOOD LOCK
Filed April 28, 1937   2 Sheets-Sheet 2
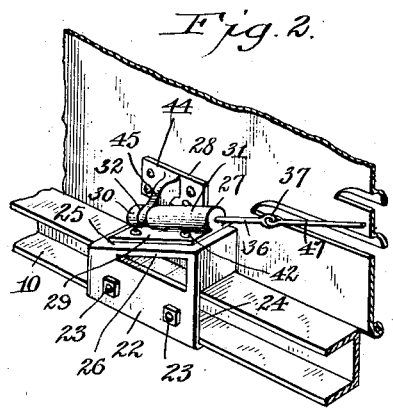
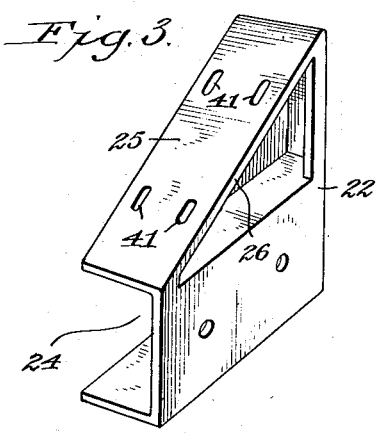
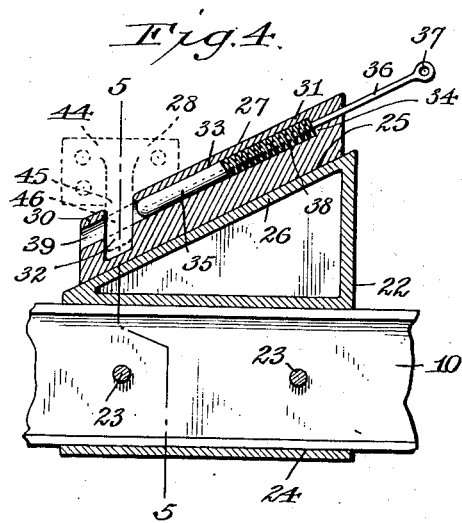
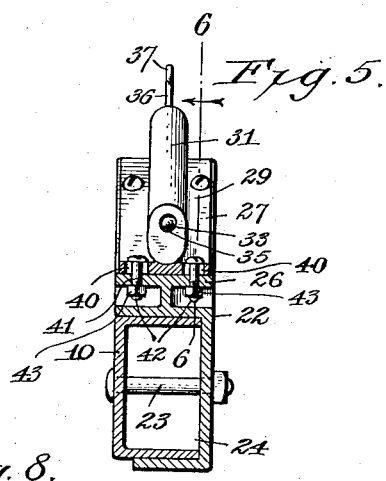
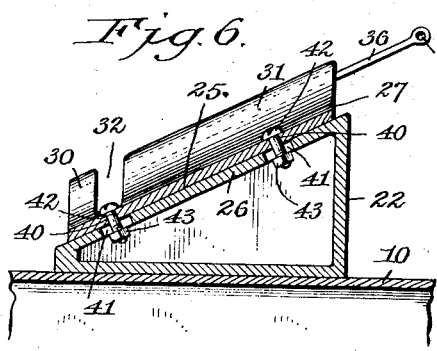
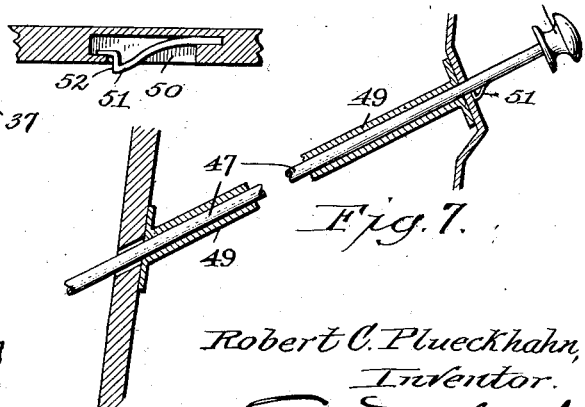
Robert C. Plueckhahn, Inventor.
Attorney.

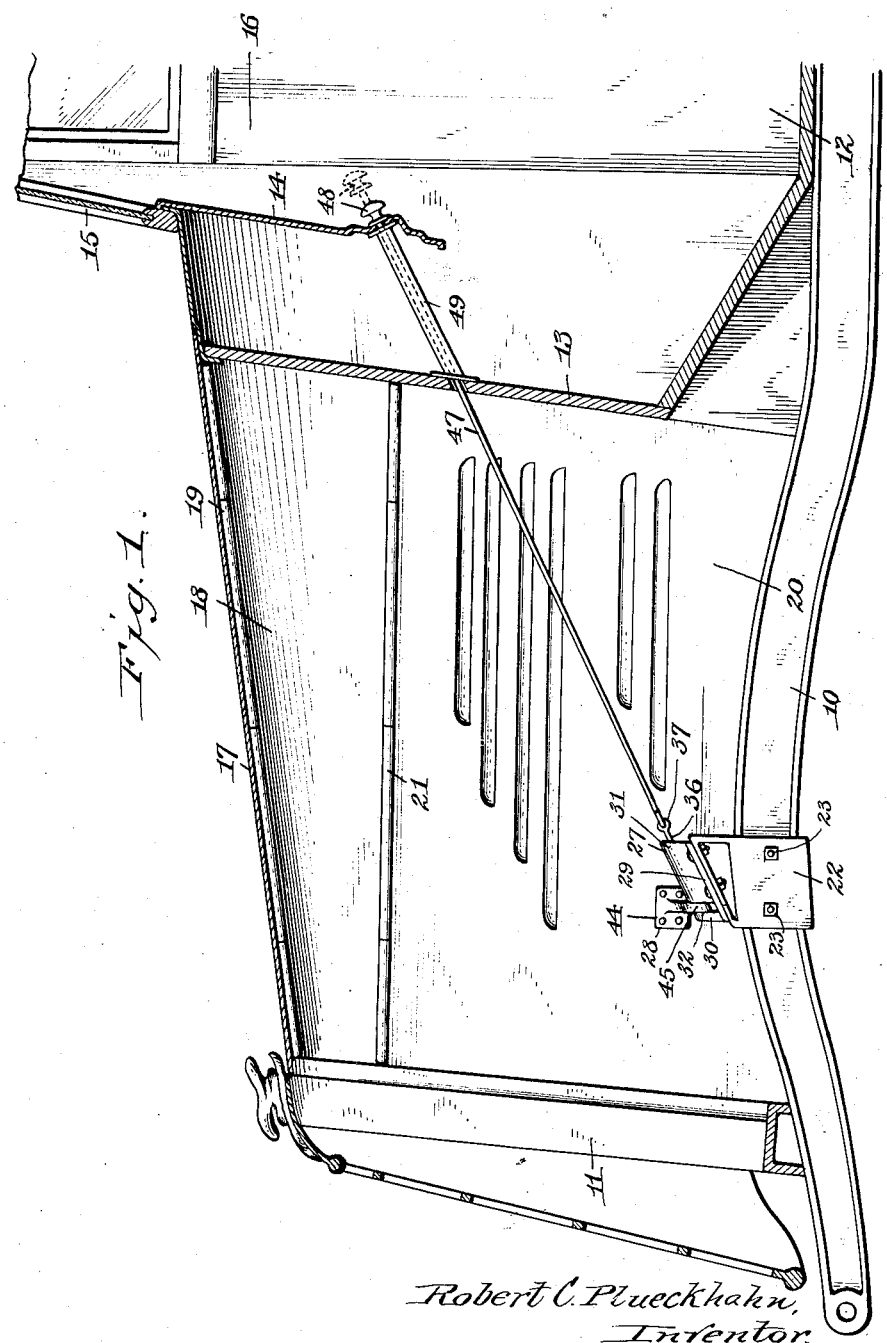

Patented June 13, 1939

2,162,638

UNITED STATES PATENT OFFICE 2,162,638

DASH MANIPULATED HOOD LOCK

Robert C. Plueckhahn, Buffalo, N. Y.

Application April 28, 1937, Serial No. 139,543

3 Claims. (Cl. 292—174)

My invention relates to hood locks for automobiles, and the primary object thereof is to provide improved means for locking the hood enclosing the motor of an automobile so as to guard against access being had to the same and certain other operating parts of the automobile by unauthorized persons.

Another object of my invention is to provide a device of the character mentioned which is simple and effective, and comprises comparatively few parts operable from within the body of the automobile, so that when the hood is locked and the doors of the automobile locked against entrance, the motor and all operating parts adjacent thereto are inaccessible; it being necessary to first unlock the doors of the automobile before unlocking the hood in order to gain access to the parts enclosed by the latter.

A further object of my invention is to provide an improved locking-device, including a lock-latch or bolt operable from the instrument-board within the body of the automobile through the medium of an actuator within convenient reach of the operator.

A still further object of my invention is to provide an improved mounting for the lock-latch or bolt, in association with a part secured to the inner side of the louvered side panel of the hood, which mounting, in its highest degree of perfection, is secured to the chassis and is capable of adjustment longitudinally and transversely, so that assurance may be had that the interfitting parts, carried respectively by the chassis and the automobile and the side panel of the hood, will be in proper alinement to assure free action of the lock-latch. Thus the device is capable of being applied to various makes of automobiles and assurance had that a free-acting locking-device will be provided.

My improved device is designed to overcome tampering with the operating mechanism of an automobile by unauthorized persons, and especially to prevent the use of explosives designed to be connected with the ignition-mechanism for the purpose of damaging the automobile or even injuring the user when the engine of the automobile is started.

With the above-mentioned and other objects in view, the invention consists in the novel features of construction and in the arrangement and combination of parts to be hereinafter described and more particularly pointed out in the subjoined claims.

In the drawings,

Fig. 1 is a longitudinal section through the upper portion of the front part of an automobile, showing the application of my improved locking-device to the chassis and hood, and its actuating connection accessible from within the body of the automobile.

Fig. 2 is a sectional perspective view of a portion of one of the sills or side members of the automobile chassis and the adjacent portion of the hood and the manner of locking the hood in closed position by means of my improved locking-device.

Fig. 3 is a detached perspective view of the support or bracket on which my improved locking-device is mounted.

Fig. 4 is a central longitudinal section through the body portion of the locking-device and the support or bracket, in association with one of the sills or side members of the automobile chassis shown in elevation.

Fig. 5 is a transverse section taken on line 5—5, Fig. 4.

Fig. 6 is a longitudinal section taken on line 6—6, Fig. 5, looking in the direction of the arrow crossing said line.

Fig. 7 is a section showing a portion of the actuator-rod and its guide sleeve, both being broken in length, and also a portion of the dash-board and instrument-board of the automobile.

Fig. 8 is a longitudinal section through a portion of the actuator-rod.

It may be stated at the outset that this improved locking-device may be normally retained in locking position, regardless of whether or not the doors of the automobile body are locked, and therefore this locking-device may be the sole means of retaining the hood in closed position, or it may be employed in association with the usual spring hood-catches now commonly employed to retain the hood in closed position.

In the drawings, 10 designates one of the sills or side members of the automobile chassis, 11 the radiator mounted thereon; 12 the automobile body provided with the usual dash-board 13, instrument-board 14, windshield 15, and doors 16, a portion of one of which is shown in Fig. 1. 17 designates the hood which comprises the usual top sections 18 pivotally connected together, as at 19, and the louvered or otherwise ventilated side sections 20 pivotally attached to the top sections 18, as at 21.

Since the formation of the sills or side members of the chassis vary, I prefer to provide what I term an adapter support or bracket 22 which may vary in shape to enable its attachment to any particular design of sill or side member, such as by means of bolts 23, or otherwise. This support or bracket is channeled in preferred form, as at 24, to receive the sill or side member to which it is to be attached, and its upper surface 25 is inclined upwardly and rearwardly for attachment thereto of the locking-device proper. This upwardly and rearwardly inclined surface is formed by a top plate 26 beneath which the support or bracket is made hollow, for a purpose to be hereinafter pointed out.

The locking-device proper comprises what may be termed a fixed or chassis member 27 and a movable or hood member 28. The fixed or chassis member is adjustably mounted on the upwardly and rearwardly inclined surface of the support or bracket 22, which surface may be termed a bearing face, and comprises a base 29 and sleeve portions 30, 31, spaced apart, as at 32. These sleeve portions rise from the base and are preferably of different lengths, the longer sleeve portion 31 being bored out, as at 33, from the space 32 upwardly and rearwardly toward the rear end of the fixed or chassis member to form a forwardly and downwardly-facing end abutment wall 34, and in said sleeve portion 31 is slidably arranged a lock-bolt 35, from the rear end of which projects a rod 36 which, in the particular construction illustrated, is passed through said abutment wall and provided with an eye 37 at its end. Surrounding the rod 36 and bearing with one end against said abutment wall and with its other end against the lock-bolt 35, is a spiral spring 38 which tends to force the lock-bolt 35 downwardly and forwardly through the space 32 between the two sleeve portions 30 and 31 and enter a bore 39 in the short sleeve portion 30 alined with the bore 33.

The base of the fixed or chassis member of the locking-device is provided with transversely elongated bolt-openings 40, and the top plate 26 of the adapter support or bracket is provided with longitudinal elongated bolt-holes 41, through which bolt-holes 40 and 41, screw-bolts 42 are passed, to which, within the hollow portion of the adapter support or bracket, nuts 43 are applied. It will thus be apparent that the fixed or chassis member of the locking-device may be longitudinally and transversely adjusted on said support or bracket, and by reason of said nuts being readily accessible, said member can be firmly secured in any adjusted position.

The movable or hood member 28 of the locking-device comprises a plate 44 and a lock-lug 45 extending inwardly from said plate, the plate being riveted or otherwise fastened to the inner side of the louvered side section 20 of the hood. The lock-lug 45 is adapted to enter the space 32 between the two sleeve portions 30 and 31 of the device, and it has an opening 46 therethrough (shown in dotted lines in Fig. 4) which has its axis co-incident with the axes of the bores 33, 39 in said sleeve portions when the side section of the hood is in closed position, as illustrated in Fig. 2.

By reason of the transversely elongated bolt-openings 40 in member 27 and the longitudinal bolt-holes 41 in the adapter support or bracket 22, member 27 can be adjusted both longitudinally and transversely to assure free entrance of the lock-lug 45 into the space 32 of said member, with the axis of the opening 46 therein alined with the bores 33 and 39 of the two sleeve portions of the device. Moreover, the lateral adjustment may be effected to a degree that will assure firm impact of the side section of the hood against the sill or side member 10 of the chassis and thus prevent rattling in the event that this improved locking-device is employed as the sole means of retaining the hood in closed position.

Although I have illustrated one locking-device at one side of the automobile, it is to be understood that two such devices will be employed to lock opposite side sections of the hood, and each is adapted to be controlled from the instrument board, or any other point within the automobile body. It is, however, of decided advantage to provide actuating-mechanism wholly movable in approximately a straight line in which the lock-bolt 35 is disposed, and with this in view, I secure an actuator-rod 47 to the eye 37 of the rod 36 projecting from the lock-bolt. This rod 47 extends rearwardly and upwardly through the dash-board 13 and through the instrument board 14, and at its rear end has a finger-knob 48 which normally bears against the instrument board, as shown in Fig. 1; it being so retained by the spiral spring 38 arranged within the locking-device, and when so positioned the lock-bolt 35 will be projected through the lock-lug 45 and be entered in the sleeve 30, thereby firmly locking the movable section of the hood to the chassis of the automobile. By connecting the rod 47 with the eye 37 of the rod 36, for example by means of another eye formed on the rod 47, as shown in Figs. 1 and 2, an articulated actuating device is provided which, when the lock member 27 is adjusted transversely, longitudinally, or in both such directions, the position of the knob 48 of the actuating device need not be changed since, regardless of the adjustment made, free actuation of all parts of the device is assured without binding action of any moving part of the mechanism. It will be apparent that the hood can only be unlocked from within the automobile, and when leaving the same with the doors of the automobile body locked, access to the interior of the hood cannot be had by unauthorized persons.

I prefer to slidably arrange the actuator-rod within a guide sleeve 49, disposed between the dash-board 13 and the instrument-board 14, opposite ends of said guide sleeve being connected to said dash-board and instrument-board in any suitable manner. The bore of said guide sleeve is of a size to slidably receive the actuator rod 47, and at a suitable point in the length of the latter a laterally-opening pocket 50 is formed in which a spring catch 51 is located, the catch having an abrupt locking portion 52 adapted to engage the inner surface of the instrument-board 14 when the actuator-rod is drawn rearwardly, as shown in Fig. 7. In this position the lock-bolt is drawn rearwardly and upwardly so as to assume the position shown in Fig. 4, in which position it is withdrawn from the lock-lug 45 and from the bore 39 formed in the short sleeve portion 30, thus enabling said lock-lug to be withdrawn from the space 32 between the two sleeve portions 30 and 31 of the device, which action takes place upon opening the side section of the hood to which the lug 45 is secured.

With the parts in the position shown in Figs. 4 and 7, it is simply necessary to close the hood so that the lock-lugs 45 on the side sections of the same enter the spaces 32 of the fixed or chassis members of the lock-devices at opposite sides of the automobile, after which the spring catches 51 may be depressed and the actuator-rods 47 forced forwardly. Under such conditions the spring catches are retained in depressed position within the guide sleeves 49, while the lock-bolts 35 are passed through the lock-lugs 45 and enter the bores of the shot sleeve portions 30 of the respective lock-devices.

To gain access to the interior of the hood from either side of the automobile, the actuator-rod 47 on the corresponding side of the automobile is drawn rearwardly to release the lock-bolt 35 from the lock-lug 45; and while this places the spring 38 under increased tension, the lock-bolt will be so retained by the spring-catch 51 which automatically projects from the actuator-rod and engages the inner face of the instrument-board.

Although I have shown an actuator-rod connected to the rod 36 of the lock-bolt, the rod 36 and the actuator rod 47 are in effect a single rod and may be so considered, particularly when the device is constructed without providing for the adjustment of the chassis or of the lock member 27 on the support or bracket 22, which is a a feature of my invention which need not be utilized when providing this locking mechanism for new cars if proper care is taken in positioning the cooperating parts on the hood and chassis of the automobile, since the essence of this invention is to provide locking-mechanism which will be simple in construction and to arrange the actuating parts so that all are disposed in a straight line, thus dispensing with the use of cables, direction-changing pulleys, levers, and other parts usually interposed between the primary actuator and the locking element.

It will of course be understood that the support or bracket could be rendered adjustable in other ways than herein particularly described, without departing from the spirit of my invention or sacrificing any of the advantages thereof.

Having thus described my invention, what I claim is:

1. A locking-device for hoods of automobiles designed to lock the hood against opening movement, comprising a support secured to the chassis of the automobile and having an upwardly and rearwardly-inclined supporting surface, a lock member secured to said supporting surface and having two sleeve-like portions axially co-incident and separated by an intervening space to receive a lock-lug having an opening therethrough corresponding in diameter with the bores of said sleeve-like portions and disposed at an acute angle thereto, one of said sleeve portions being longer than the other, a bolt in the longer of said sleeve-like portions, a spring within the longer of said sleeve-like portions serving to project said bolt through said lock-lug and into the shorter of said sleeve-like portions, means to draw said bolt wholly into the longer of said sleeve-like portions against the action of said spring, and means to retain said bolt in unlocking position and releasable to permit said spring to force said bolt into locking position.

2. A locking-device for hoods of automobiles designed to lock the hood from the inside against opening movement, comprising a support secured to the chassis of the automobile and having an upwardly and rearwardly inclined supporting surface and provided with longitudinal slots, a lock member secured to said supporting surface and having transverse slots formed therein, each of said transverse slots crossing a longitudinal slot in the support and being paired therewith, a bolt passed through each pair of said slots, said lock member having two sleeve-like portions axially coincident and separated by an intervening space adapted to receive a lock-lug extending inwardly from the hood of the automobile and having an opening therethrough, a bolt in one of said sleeve-like portions, a spring serving to project said bolt through said lock-lug and into the other of said sleeve-like portion, said bolt being disengaged from said lock-lug upon pulling said bolt rearwardly and upwardly, and means accessible from the interior of the body portion of the automobile for so pulling said lock bolt and to retain said bolt in unlocking position and manually controlled to permit said spring to force said bolt into locking position.

3. A locking-device for hoods of automobiles designed to lock the hood against opening movement, comprising a support secured to the chassis of the automobile and having an upwardly and rearwardly inclined bearing face, a lock member seated on said bearing face and adjustable on said support, said lock member being adapted for locking engagement with a second lock member secured to a wall of the automobile hood, said first-mentioned lock member having a spring-pressed lock-bolt adapted to lock said lock members together, and an actuating rod articulated to said lock-bolt and extending rearwardly therefrom to a point within the automobile body in a plane above that of the highest point of said support whereby adjustment of said first-mentioned lock member can be made without causing binding action of any of the movable parts of the device.

ROBERT C. PLUECKHAHN.